Figure 1:
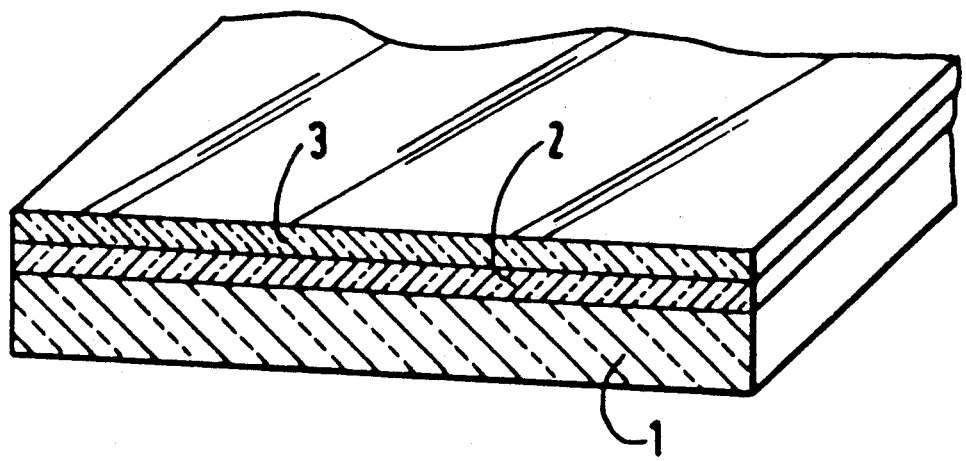

United States Patent [19]

Diemunsch et al.

[11] Patent Number: 5,098,790
[45] Date of Patent: Mar. 24, 1992

[54] MULTILAYER, UV-RADIATION STABILIZED POLYCARBONATE PANEL

[75] Inventors: Robert Diemunsch, Colmar; Roland Zeller, Pfastatt, both of France

[73] Assignee: Kaysersberg Packaging, S.A., Kaysersberg, France

[21] Appl. No.: 403,863

[22] Filed: Sep. 7, 1989

[30] Foreign Application Priority Data

Sep. 7, 1988 [FR] France .................. 88 11703

[51] Int. Cl.⁵ .............. B32B 27/36; B32B 3/12; B29C 47/06
[52] U.S. Cl. .................. 428/412; 428/419; 428/178; 264/173; 264/211.23; 264/211.12; 156/244.13
[58] Field of Search .................. 428/412, 419

[56] References Cited

U.S. PATENT DOCUMENTS 4,707,393  11/1987  Vetter .................. 428/412 X

Primary Examiner—P. C. Sluby
Attorney, Agent, or Firm—Breiner & Breiner

[57] ABSTRACT

Synthetic resin panel consisting of a core layer (1) of polycarbonate resin covered on at least one of its outer sides by a storage layer (2) containing between 5 and 15% by weight of an UV absorber, and on that side of said storage layer facing away from said core layer, by a cover layer (3) of synthetic resin containing an UV absorber, wherein said UV absorber, incorporated in said cover layer (3), different from said UV absorber incorporated in said storage layer (2), is of low volatility and is present at a concentration exceeding 2% by weight.

4 Claims, 1 Drawing Sheet

MULTILAYER, UV-RADIATION STABILIZED POLYCARBONATE PANEL

The present invention concerns a multi-layer panel made of synthetic resin stabilized against ultraviolet radiation.

More specifically, the invention describes a synthetic resin panel with a core layer made of polycarbonate, having on at least one of its outer sides a storage layer made of polycarbonate containing between 5 and 15% by weight of an UV absorber, this layer in turn being coated with a cover layer made of synthetic resin containing a low volatility UV absorber.

Numerous manufacturing processes for stabilizing plastics against UV have been previously described. EP-A-0110238, corresponding to U.S. Pat. No. 4,707,393, describes a method for making hollow structured multilayer multiple-wall synthetic resin panel manufactured by co-extrusion using a multilayer die and made up of structured polycarbonate core layer coated on at least one of its two outer sides with a synthetic resin containing 2 to 15% by weight of a volatile UV absorber, the latter being in turn coated with a cover layer containing less than 2% of a volatile UV absorber. The description indicates that commonly used ultraviolet absorbers are volatile in the sense that, at a content of 0.5%, they exhibit noticeable sublimation at a temperature of 260° C. under normal pressure and more pronounced sublimation under vacuum, accompanied by deposition of the UV absorber by condensation on cooler equipment components (col. 3, 1.32-37 of U.S. Pat. No. 4,707,393).

Such panels are unsatisfactory since, over time, the cover layer ages, resulting in yellowing and in the presence of micro-cracks, which diminishes the material's optical and mechanical properties.

EP-A-0110221 describes a synthetic resin panel composed of a polycarbonate core layer having at least one of its outer sides coated with a polycarbonate layer containing at least 2% by weight, and preferably 5 to 15% by weight, of a conventional UV absorber.

The UV absorbers mentioned in this patent as being appropriate are the same ones mentioned in EP-A-0110238 as being volatile. An excudation of these UV absorbers, which are present at high concentration in the material used in the cover layer, occurs under the processing conditions and leads to the crucial problem of clogging of the production machinery and consequent disruption of the production line operation, in particular when the sizing plates (twin-wall panels) or the casting rollers (solid panels) are involved. The panel surface is marred by deposits and scratches constituting a redhibitory defect.

EP-A-0247480 describes a branched polycarbonate containing a specific hydroxybenzotriazole compound, described in DOS 1670951, for stabilization against UV. This application also describes using such a polycarbonate for manufacturing multi-layer plastic panels by co-extrusion, the core layer, preferably being composed of branched polycarbonate, being covered on at least one of its outer sides, with an UV absorption layer of branched polycarbonate containing between 1% and 15% by weight, and preferably between 5% and 15% by weight, of the concerned UV absorber, and having a thickness of 10 to 50 μm (p. 1, l. 15-27, p. 4, l. 20-21 and p. 8, l. 16-29). This UV absorbing layer may be covered with another 10-30 μm layer which is substantially free of UV absorbers (p. 8, l. 31-34).

In the embodiment where such a panel of is manufactured without a cover layer, it would be subjected to progressive degradation of its UV radiation stabilization over time due to the diminution in the anti-UV agent concentration due to an extraction therefrom by the elements or photochemical degradation. On the other hand, in the embodiment where such a panel is manufactured with a cover layer containing substantially no UV absorber, the aging of the latter over time could not be avoided.

Moreover, EP-A-247480 concerns only branched polycarbonate; and in fact it indicates, and this is confirmed by the comparative example, that the hydroxybenzotriazoles (described in DOS 1670951) utilized as UV absorbers only yield an improvement, relative to previously employed hydroxybenzotriazoles, when employed with branched polycarbonate, and not with linear polycarbonate.

One object of the present invention is to provide a multi-layer synthetic resin panel stabilized against UV radiation and whose outer surface(s) are durably stabilized against weathering.

Another object of the present invention is providing a multi-layer panel stabilized against UV, the manufacturing of which by co-extrusion does not lead to clogging of the production equipment and, in particular, does not lead to clogging of the sizing plates or the casting rollers nor to deposits or scratches on the panels.

The present invention provides a panel consisting of a core layer of polycarbonate resin covered on at least one of its outer sides by a storage layer of polycarbonate resin containing between 5 and 15% by weight of an UV absorber, and on that side of said storage layer facing away from said core layer, by a cover layer of synthetic resin containing at least 2% by weight, and preferably between 3 and 5% by weight, of a low volatility UV absorber, different from that contained in said storage layer.

FIG. 1 (attached) schematically shows a panel according to the invention, in the embodiment wherein only one of the outer sides of the core layer made of solid polycarbonate is covered with storage and cover layers.

Figure 2:
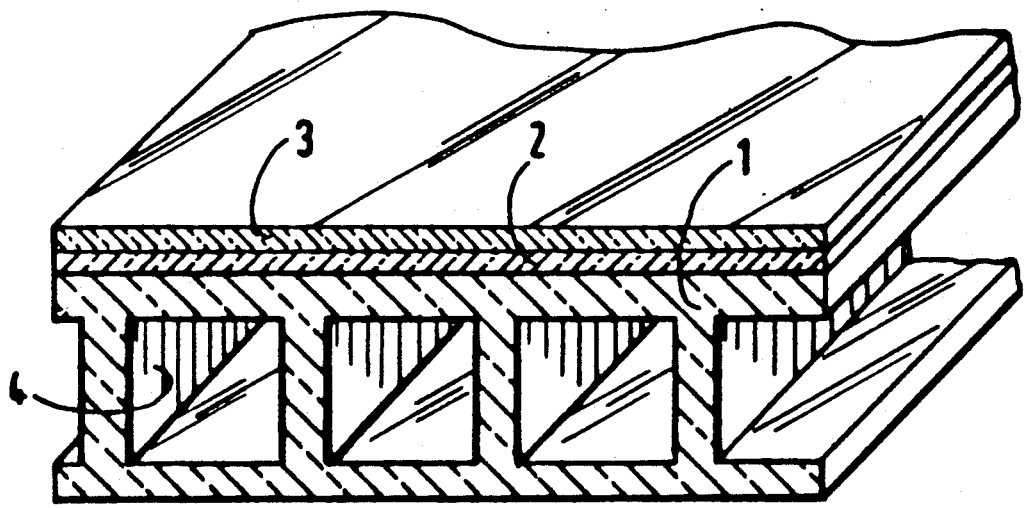

FIG. 2 (attached) schematically shows a panel according to the invention, in the embodiment wherein only one of the outer sides of the core layer made of structured polycarbonate is covered with storage and cover layers.

The core layer (1), comprising the panel's core layer is made of hollow multiple wall polycarbonate, i.e. containing hollow chambers (4), or of solid polycarbonate. This layer has a low UV absorber concentration.

The storage layer (2), which coats at least one of the outer sides of the core layer (1), is made of linear or branched polycarbonate. It contains a high concentration of UV absorber: from 2% to 15% by weight, and generally between 7 and 15% by weight. The storage layer's thickness is between 5 and 50 μm. It must be sufficient to insure absorption of any UV radiation passing the cover layer, without being totally absorbed by the cover layer.

The UV absorbers contained in the storage layer are intended to insure panel protection following their migration towards the surface, thereby making up the decrease in efficiency of the UV absorbers in the cover layer caused by their diffusion during exposure to the athmosphere or by photochemical degradation. The UV absorbers in the storage layer are of the conventional type, e.g. hydroxybenzotriazoles having the formula:

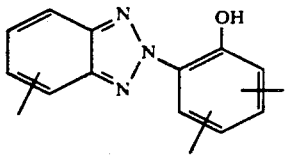

among which can be cited Tinuvin 350, Cyasorb 5411 and Tinuvin 234.

These products may be used alone or in combination.

The cover layer (3) coating the storage layer (2) is composed of a synthetic resin based, for example, on branched polycarbonate, linear polycarbonate or on polyarylate, e.g. ARDEL D 240. The cover layer stabilizes the panel against UV light. It is a thin layer, but sufficiently thick so as to insure that the volatile UV absorbers contained in the storage layer do not migrate all the way to the panel surface. A 5 to 50 μm thickness is appropriate. The cover layer's UV absorber concentration must be in excess of 2% by weight, and generally in the range of 2 to 15% by weight.

It should be understood that the upper limit on UV absorber concentration in the cover layer is not critical and in practice is determined in particular by the solubility of said UV absorber in the resin used for the cover layer and by economic considerations.

The UV absorbers used in the cover layer are characterized by the fact that they are of low volatility.

The anti-UV agents employed in the cover layer must satisfy the following criteria:

molecular efficiency equal to anti-UV agents commonly used for polycarbonates, low volatility within the range of polycarbonate processing temperatures.

The anti-UV agents used in the cover layer are, therefore, different from those employed in the storage layer.

The anti-UV agent's volatility may be determined by a thermogravimetric analysis carried out on the pure compound using a 10° C./min. temperature ramp and argon sweeping. The product is considered as being of low volatility if the temperature corresponding to a 1% weight loss is greater than 300° C. Products exhibiting this property are exemplified by the benzotriazoles described in DOS 1670951.

Among the anti-UV agents utilized according to the present invention for the cover layer one can cite LSBT 620, commercialized by the ADEKA ARGUS company, which has the formula:

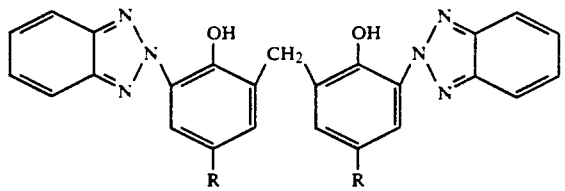

wherein R represents the group

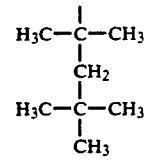

These products may be used alone or in combination.

The present invention fulfills the two above-mentioned objects and provides multi-layer synthetic resin panels which are stabilized against UV radiation by two different UV absorbers. The low volatility anti-UV agent contained in the cover layer avoids weathering of the panel surface. The storage layer anti-UV agent is a product commonly used for polycarbonate stabilization. Its migration towards the surface allows it to make up the exudation and photodegradation losses incurred by the cover layer's anti-UV agent. This system insures durable stabilization of the panel's surface(s) against weathering.

The present invention also provides a manufacturing process for the claimed panels.

According to the invention, a three layer strand co-extrusion process is carried out, wherein said storage layer and said cover layer, incorporating, as indicated above, said UV absorbers, are simultaneously deposited on said core layer using a feed-block.

The process used in the present invention consists of bringing the three material strands together in the feed-block, then transporting the strand to the die where it is spread to full width. The same panel structure can be obtained using a multilayer die.

When twin-wall panels are to be formed, the material is sized under vacuum using a former located at the die outlet. The present invention, in that it foresees use of a low volatility UV absorber in the cover layer, allows of all perturbations to proper process functioning, as well as width former clogging.

When solid panels are being formed, the cover layer UV absorber's low volatility allows, according to the invention, avoidance of deposit formation on the casting rollers.

We claim:

1. Synthetic resin panel consisting of a core layer of polycarbonate resin covered on at least one of its outer sides by a polycarbonate resin storage layer containing between 5 and 15% by weight of a volatile UV absorber, and on that side of said storage layer facing away from said core layer, a cover layer of synthetic resin is present containing an UV absorber, wherein said UV absorber incorporated in said cover layer is a material other than said volatile UV absorber incorporated in said storage layer and is of low volatility and is present at a concentration of about 2% to 15% by weight.

2. Panel according to claim 1 wherein said cover layer is made of branched polycarbonate.

3. Panel according to claim 1 wherein said cover layer with made of linear polycarbonate.

4. Panel according to claim 1 wherein said cover layer is made of polyarylate.

* * * * *